(12) United States Patent
Lam

(10) Patent No.: US 9,511,531 B2
(45) Date of Patent: Dec. 6, 2016

(54) METHOD OF FORMING THERMOPLASTIC ARTICLE

(75) Inventor: Chi Shing Lam, Central Hong Kong (HK)

(73) Assignee: GREAT FORTUNE (HK) LIMITED, Central Hong Kong (CN)

( * ) Notice: Subject to any disclaimer, the term of this patent is extended or adjusted under 35 U.S.C. 154(b) by 360 days.

(21) Appl. No.: 13/520,926

(22) PCT Filed: Jan. 8, 2010

(86) PCT No.: PCT/CN2010/070077
§ 371 (c)(1),
(2), (4) Date: Jul. 6, 2012

(87) PCT Pub. No.: WO2011/082536
PCT Pub. Date: Jul. 14, 2011

(65) Prior Publication Data
US 2013/0005927 A1    Jan. 3, 2013

(51) Int. Cl.
*B29C 49/04* (2006.01)
*C08F 20/44* (2006.01)
(Continued)

(52) U.S. Cl.
CPC ............... *B29C 49/18* (2013.01); *B29C 49/20* (2013.01); *B29C 49/24* (2013.01); *B29C 49/04* (2013.01); *B29C 49/12* (2013.01); *B29C 2045/1445* (2013.01); *B29C 2049/2008* (2013.01); *B29C 2049/2073* (2013.01);
(Continued)

(58) Field of Classification Search
CPC ............... B29C 2045/1445; B29C 2049/2008; B29C 2049/2073; B29C 2049/2402; B29C 2049/2449; B29C 49/04; B29C 49/06; B29C 49/18; B29C 49/12; B29C 49/20; B29C 49/24; B29C 45/14; B29C 49/00; B29C 49/02; B29C 2049/2416; B29C 2049/2422
(Continued)

(56) References Cited

U.S. PATENT DOCUMENTS 3,816,578 A * 6/1974 Fuller ................... B29C 49/24
156/244.14
3,859,505 A * 1/1975 Herbrand ............... A47J 27/04
219/386
(Continued)

FOREIGN PATENT DOCUMENTS

CN    1923493 A    3/2007
EP    1195236 A1   4/2002
(Continued)

*Primary Examiner* — Philip Tucker
*Assistant Examiner* — Vicki Wu
(74) *Attorney, Agent, or Firm* — Nyemaster Goode P.C.

(57) ABSTRACT

A method of forming a thermoplastic article, comprises steps of: a) positioning at least one preheated first component being hollow and having at least one open end in two co-operating first mold halves; b) extruding a blow-moldable thermoplastic material into the first component and closing the mold halves; and c) blowing the blow-moldable thermoplastic material inside the mold halves to form an article on which the first component is fixedly engaged. The method is simple in implementation, low in cost and easy in modification, and by which a thermoplastic article of varied colors, patterns, materials, and/or functional components being fixedly mounted on its outer surface could be realized.

8 Claims, 15 Drawing Sheets

(51) Int. Cl.

| | | |
|---|---|---|
| *C08G 75/23* | (2006.01) | |
| *C08F 14/06* | (2006.01) | |
| *C08G 64/00* | (2006.01) | |
| *C08F 18/08* | (2006.01) | |
| *C08F 10/06* | (2006.01) | |
| *C08F 12/08* | (2006.01) | |
| *B29C 49/18* | (2006.01) | |
| *B29C 49/20* | (2006.01) | |
| *B29C 49/24* | (2006.01) | |
| *B29C 49/12* | (2006.01) | |
| *B29C 45/14* | (2006.01) | |

(52) U.S. Cl.
CPC ............... *B29C 2049/2402* (2013.01); *B29C 2049/2412* (2013.01); *B29C 2049/2416* (2013.01); *B29C 2049/2422* (2013.01); *B29C 2049/2449* (2013.01); *B29C 2049/2481* (2013.01)

(58) Field of Classification Search
USPC .................................................. 156/244.11
See application file for complete search history.

(56) References Cited

U.S. PATENT DOCUMENTS

| | | | | |
|---|---|---|---|---|
| 3,955,697 A | * | 5/1976 | Valyi | ............ 215/12.2 |
| 4,116,374 A | * | 9/1978 | Garello | ............ B65D 25/22 |
| | | | | 215/396 |
| 4,323,411 A | * | 4/1982 | Uhlig | ............ B29C 49/18 |
| | | | | 156/244.14 |
| 4,573,596 A | * | 3/1986 | Slat | ............ B29C 49/24 |
| | | | | 215/12.2 |
| 5,089,208 A | * | 2/1992 | Nakamura et al. | ............ 264/513 |
| 5,089,209 A | | 2/1992 | Bailey et al. | |
| 5,505,612 A | | 4/1996 | Mero et al. | |
| 5,647,930 A | * | 7/1997 | Bright | ............ 156/73.5 |
| 5,972,279 A | * | 10/1999 | Harris | ............ B29C 45/14008 |
| | | | | 264/269 |
| 5,989,482 A | * | 11/1999 | Sagawa | ............ 264/515 |
| 6,171,423 B1 | * | 1/2001 | Murphy | ............ B29C 49/24 |
| | | | | 156/172 |
| 6,479,010 B1 | | 11/2002 | Golovoy et al. | |
| 2005/0281999 A1 | * | 12/2005 | Hofmann | ............ B32B 5/18 |
| | | | | 428/304.4 |
| 2008/0113060 A1 | * | 5/2008 | Richards et al. | ............ 425/393 |

FOREIGN PATENT DOCUMENTS

| | | | |
|---|---|---|---|
| EP | 1563984 | | 8/2005 |
| EP | 1563984 A1 | * | 8/2005 |
| JP | 61290029 A | | 12/1986 |
| JP | 61290029 A | * | 12/1986 |
| JP | 8099350 A | | 4/1996 |

* cited by examiner

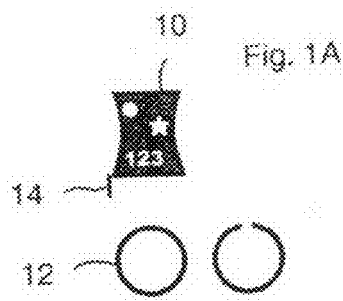
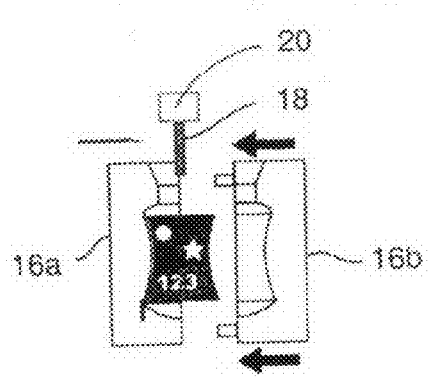
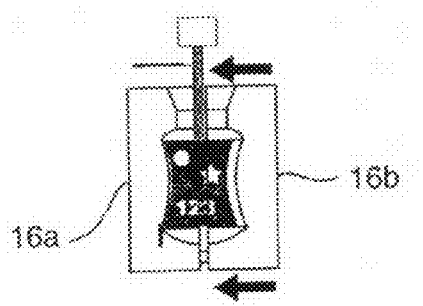
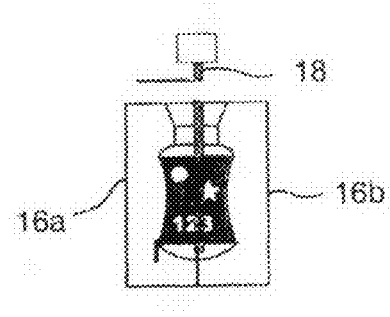
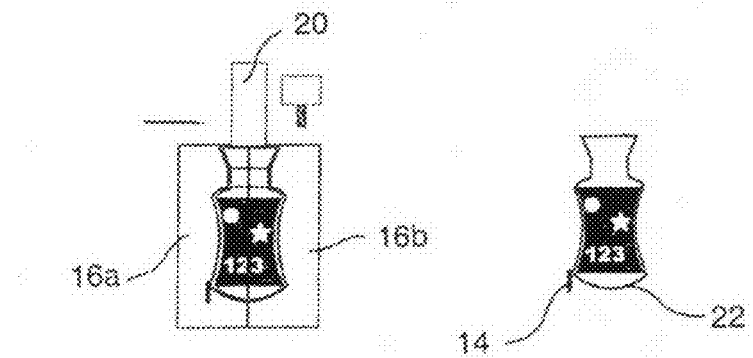
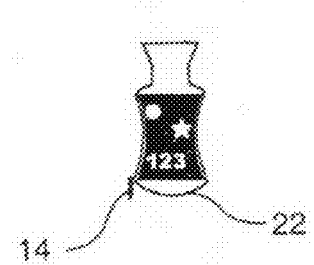
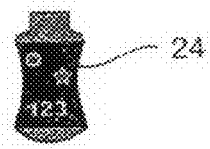

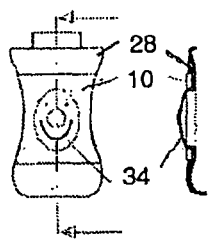 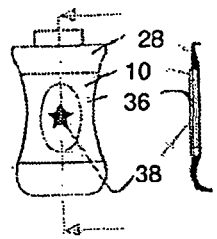
Fig. 14A  Fig. 14B  Fig. 15A  Fig. 15B
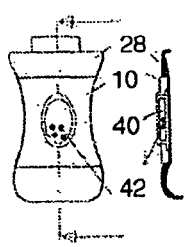 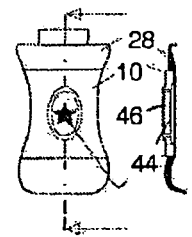
Fig. 16A  Fig. 16B  Fig. 17A  Fig. 17B
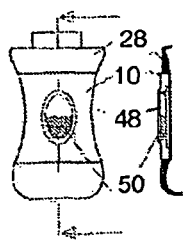 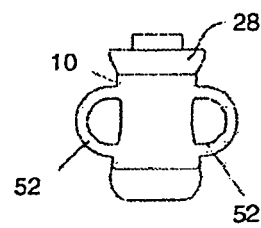
Fig. 18A  Fig. 18B  Fig. 19

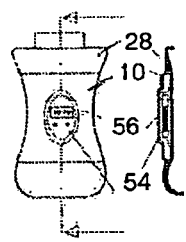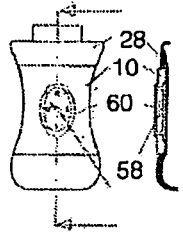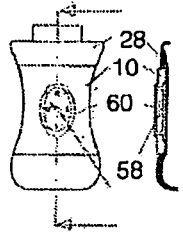
Fig. 20A    Fig. 20B                Fig. 21A    Fig. 21B
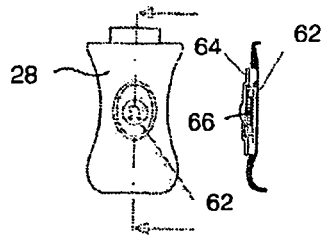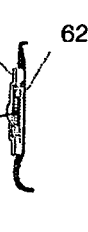
Fig. 22A    Fig. 22B

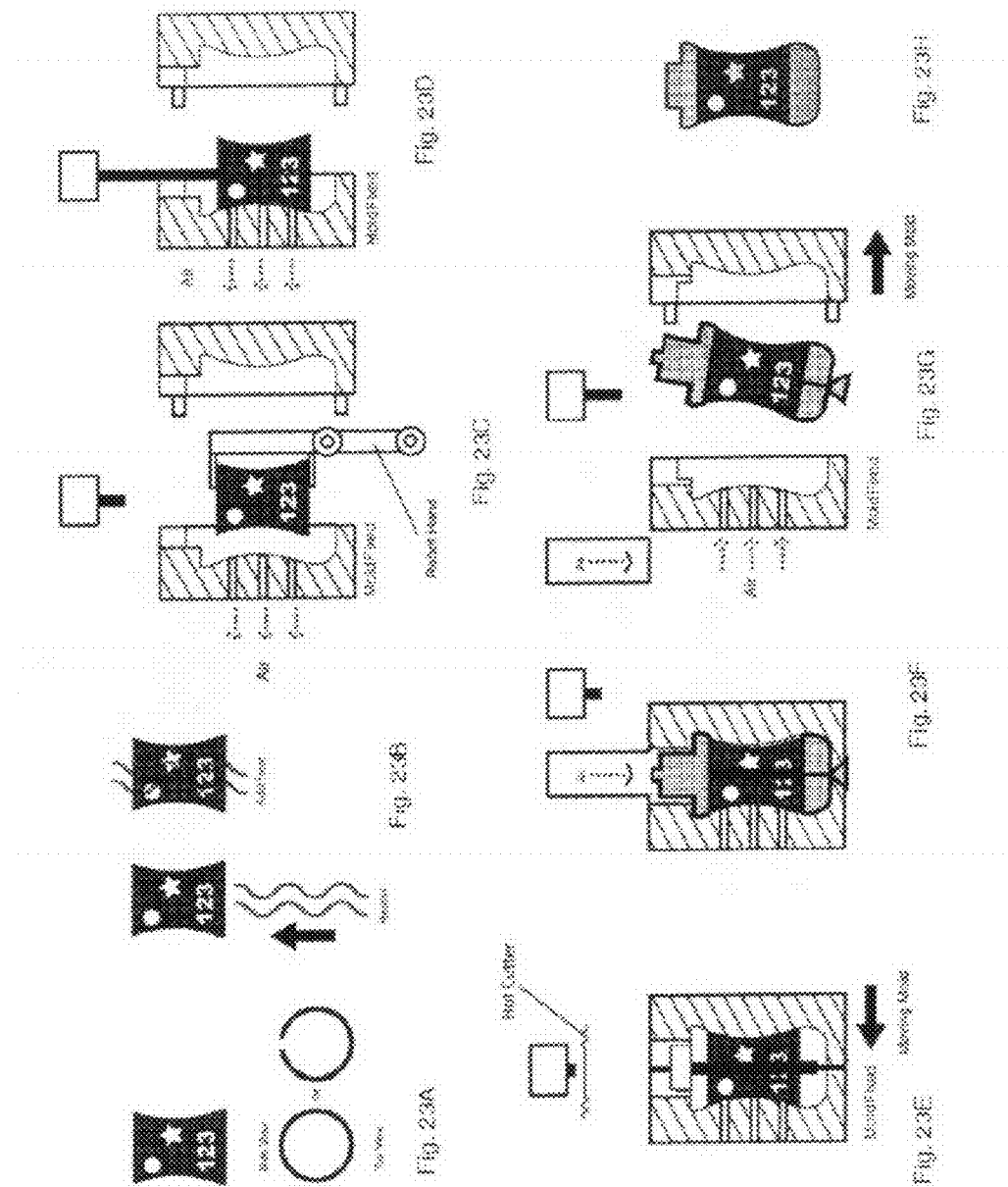

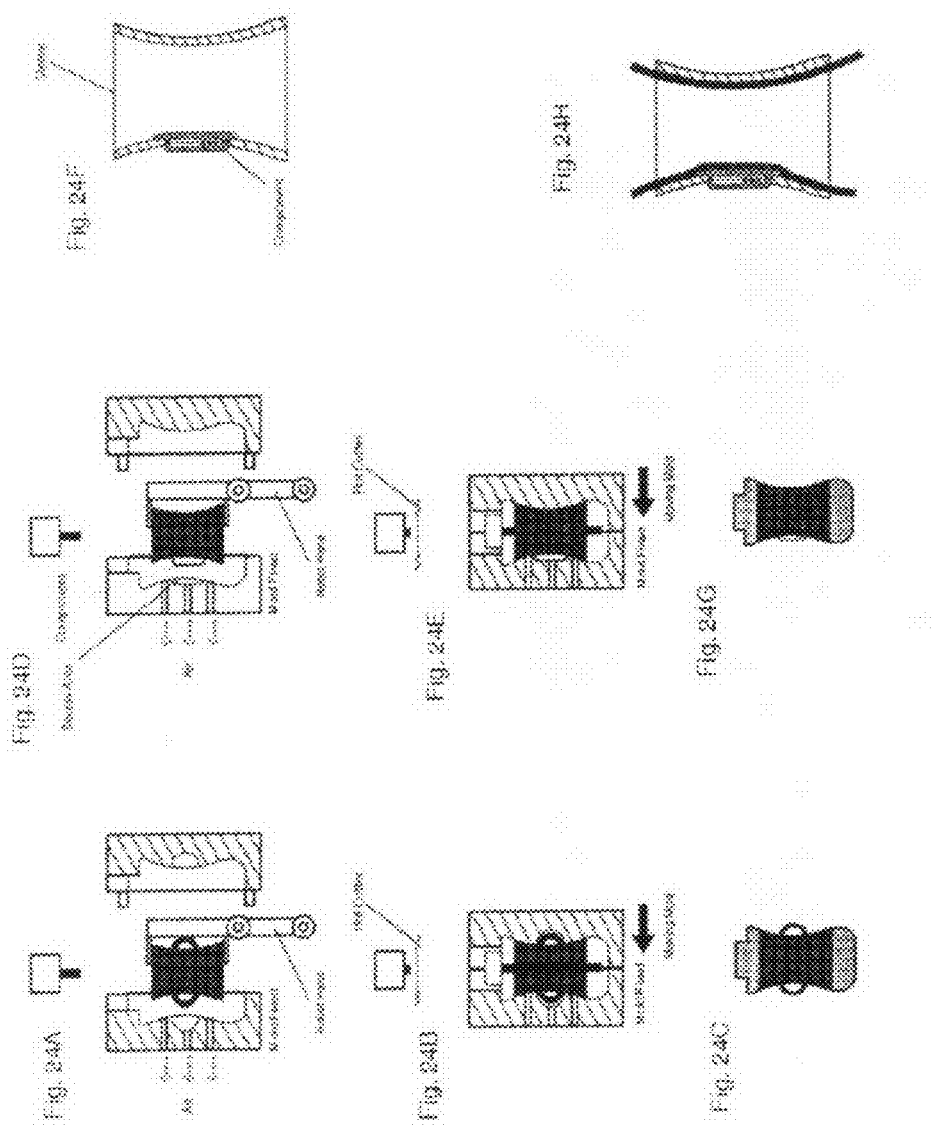

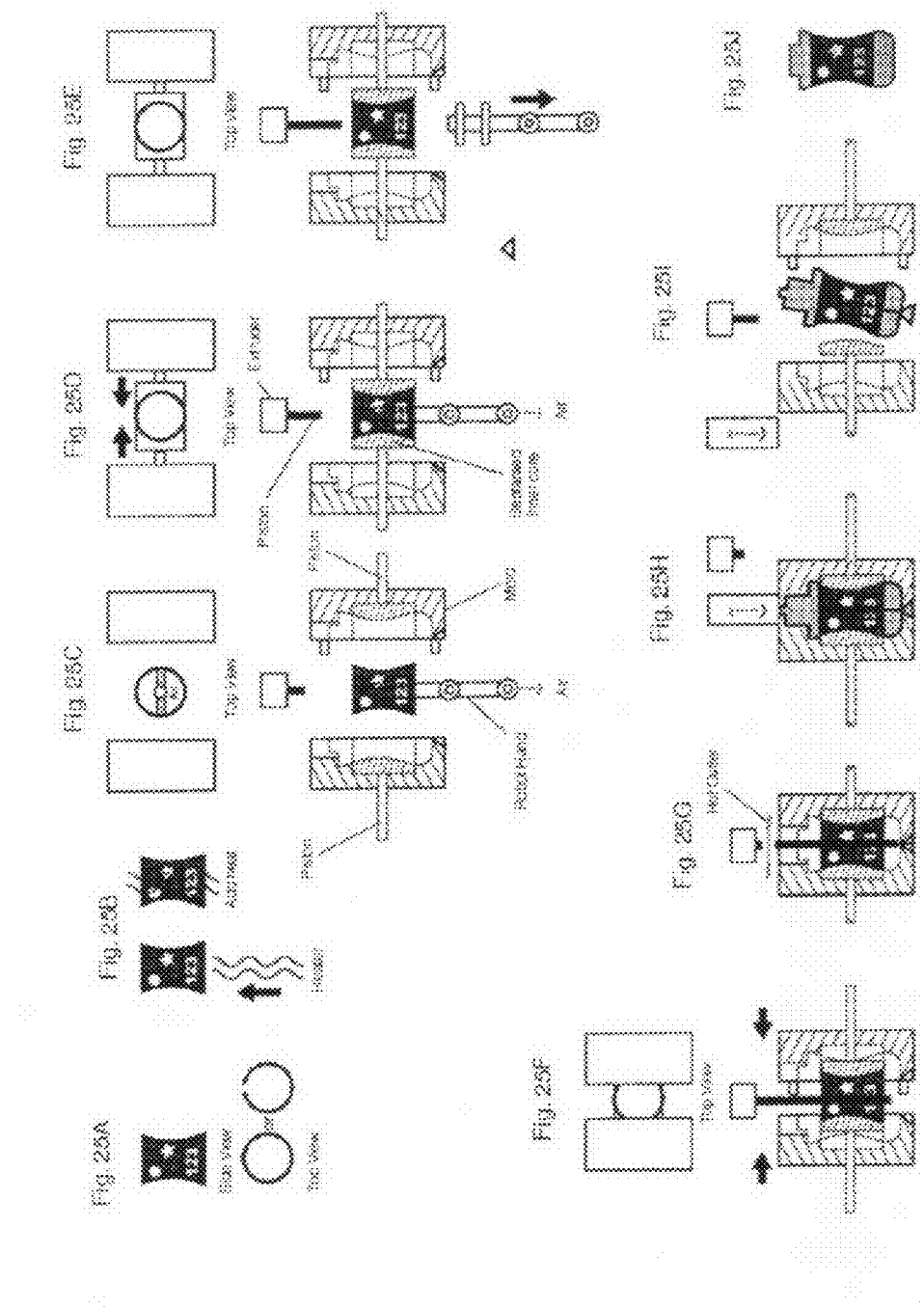

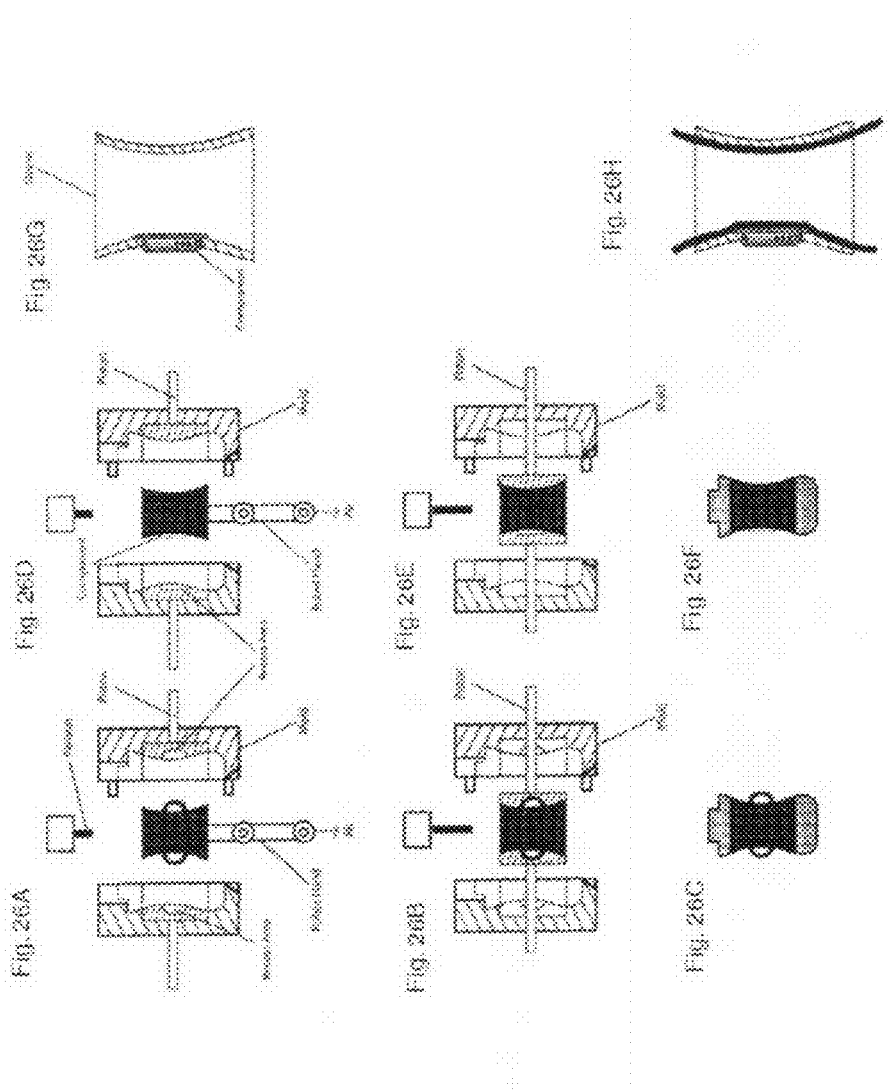

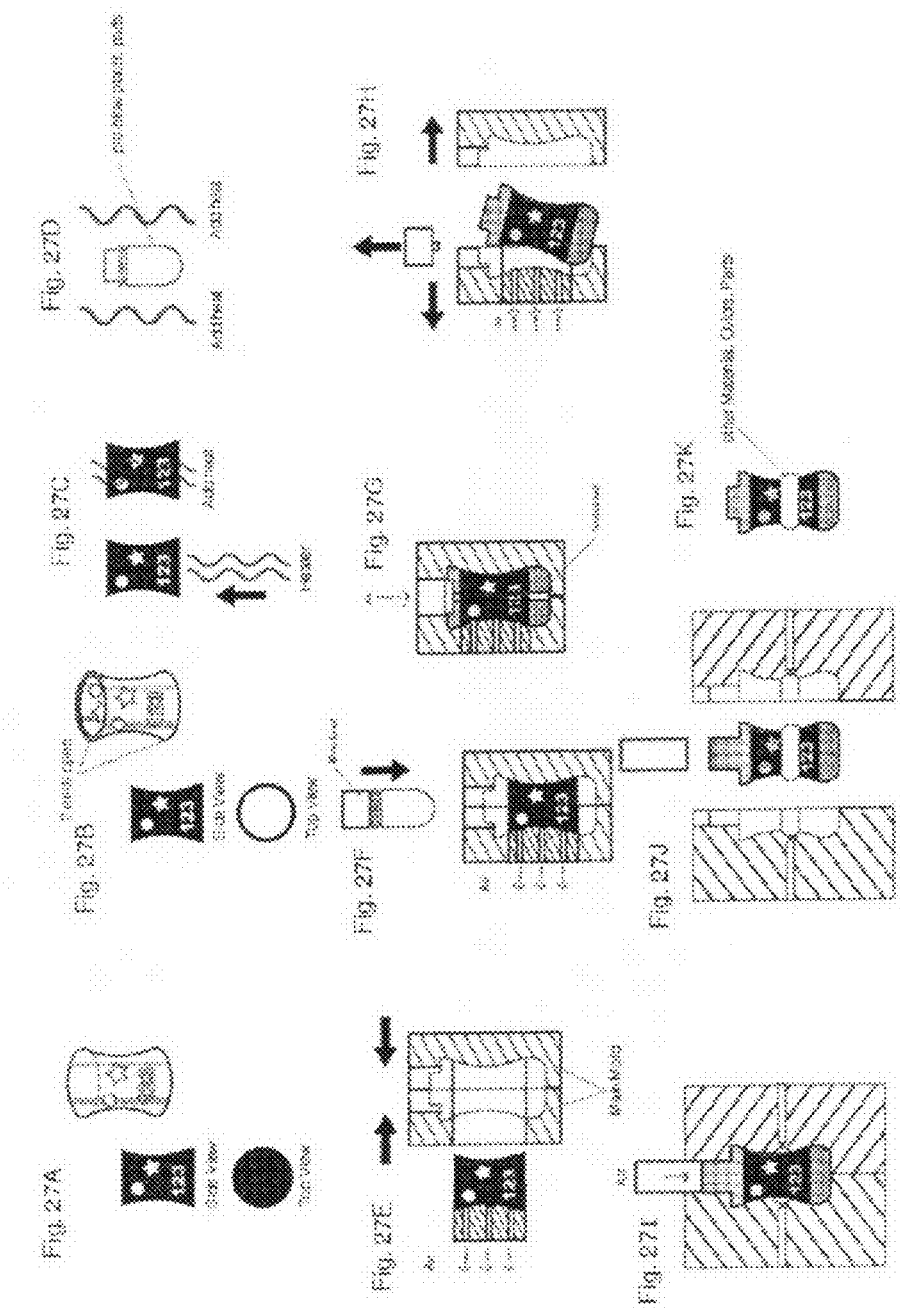

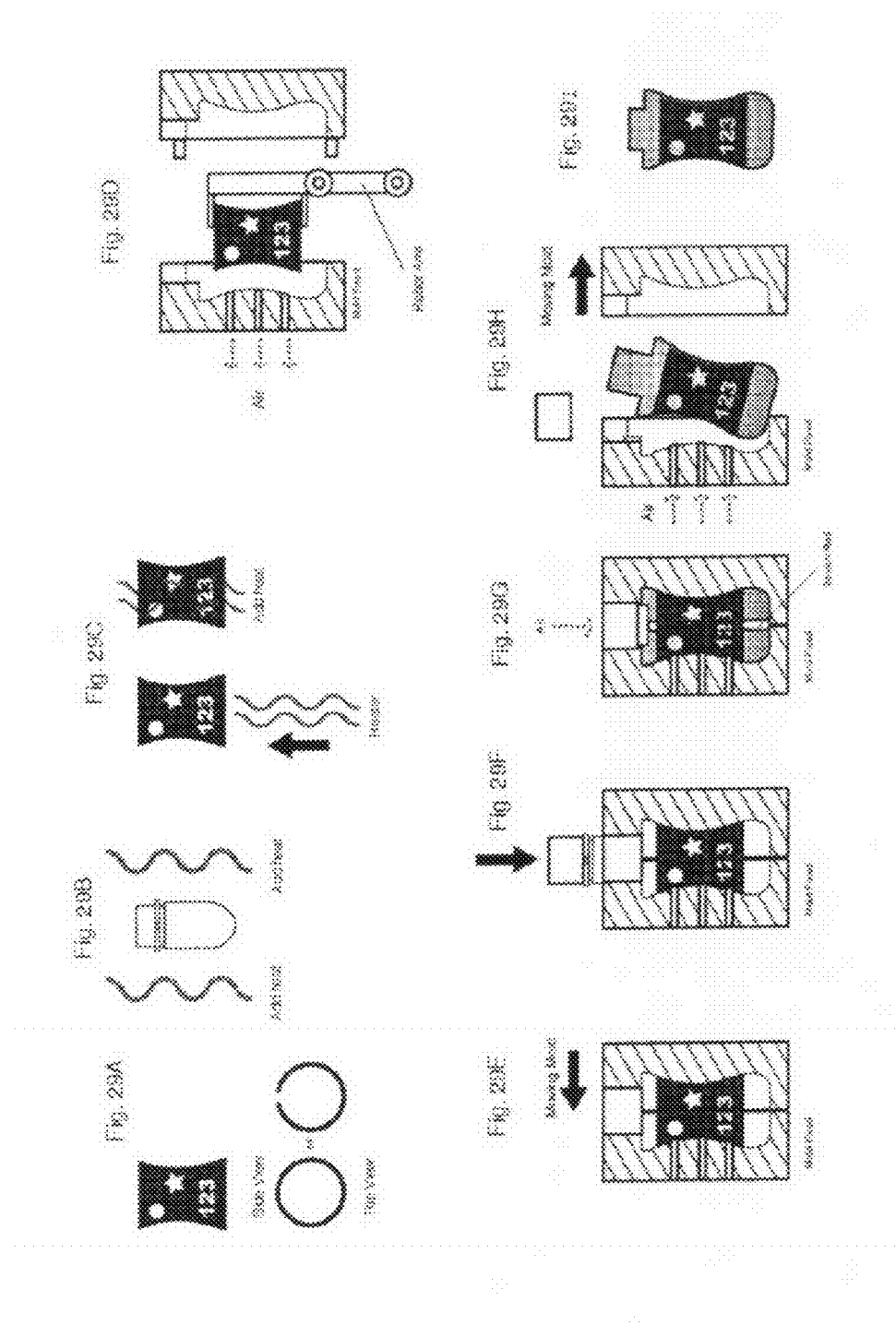

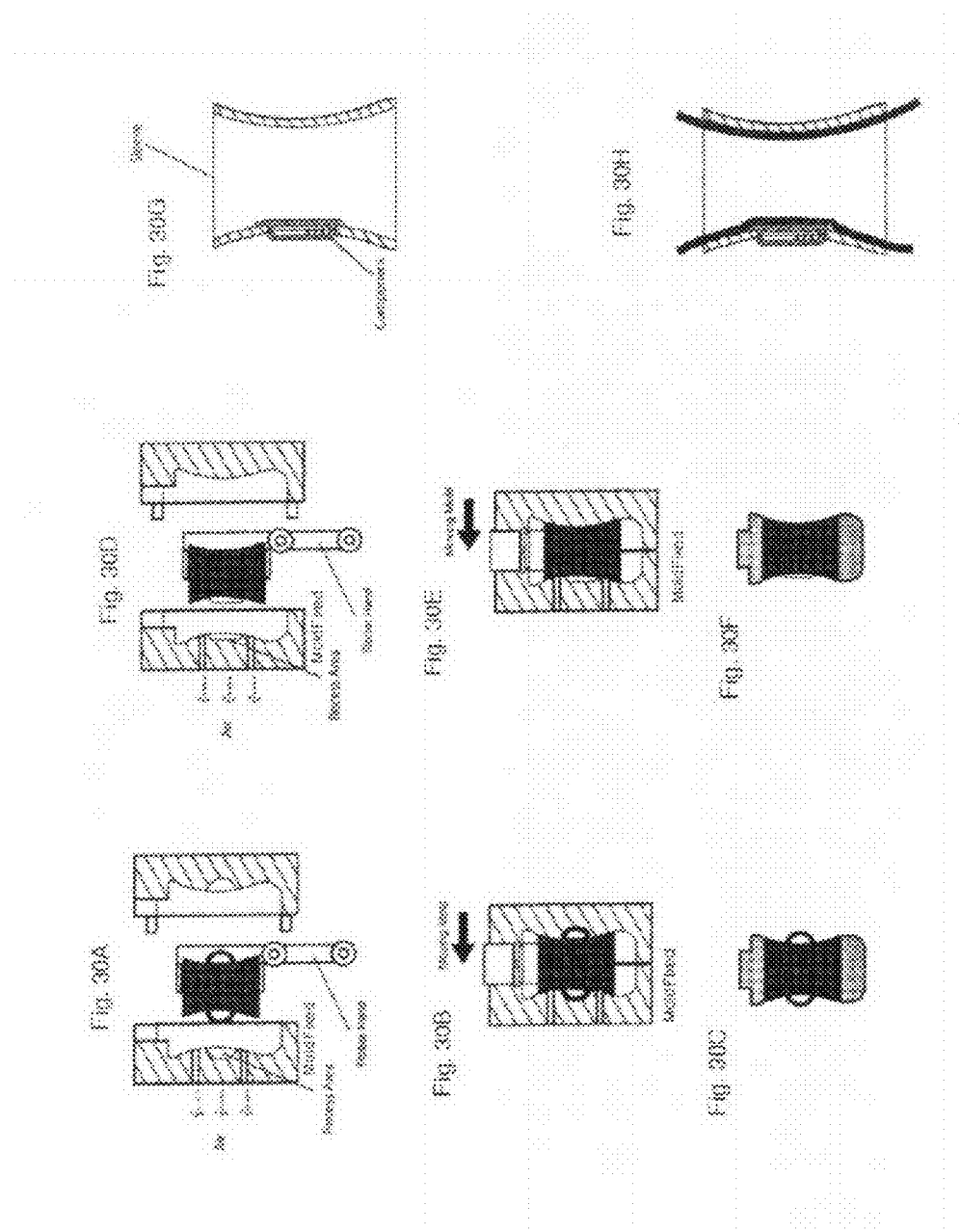

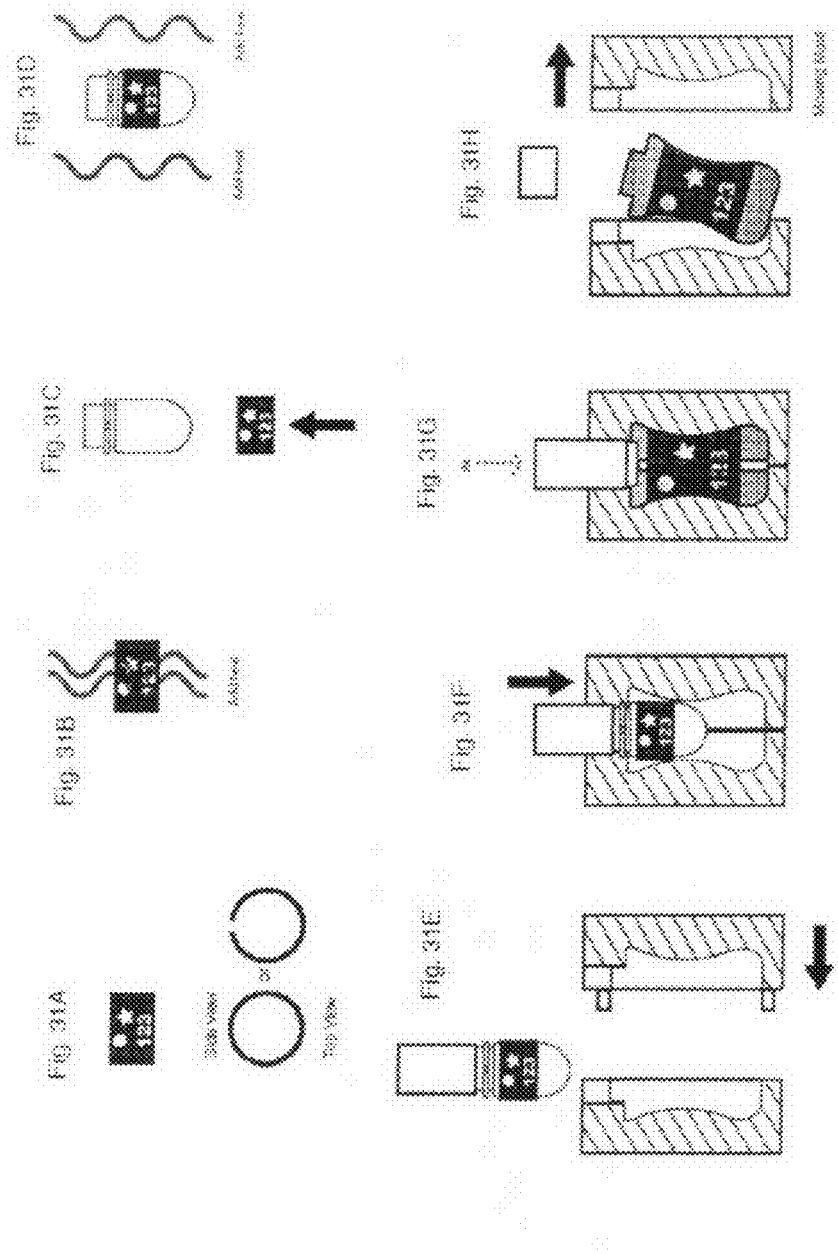

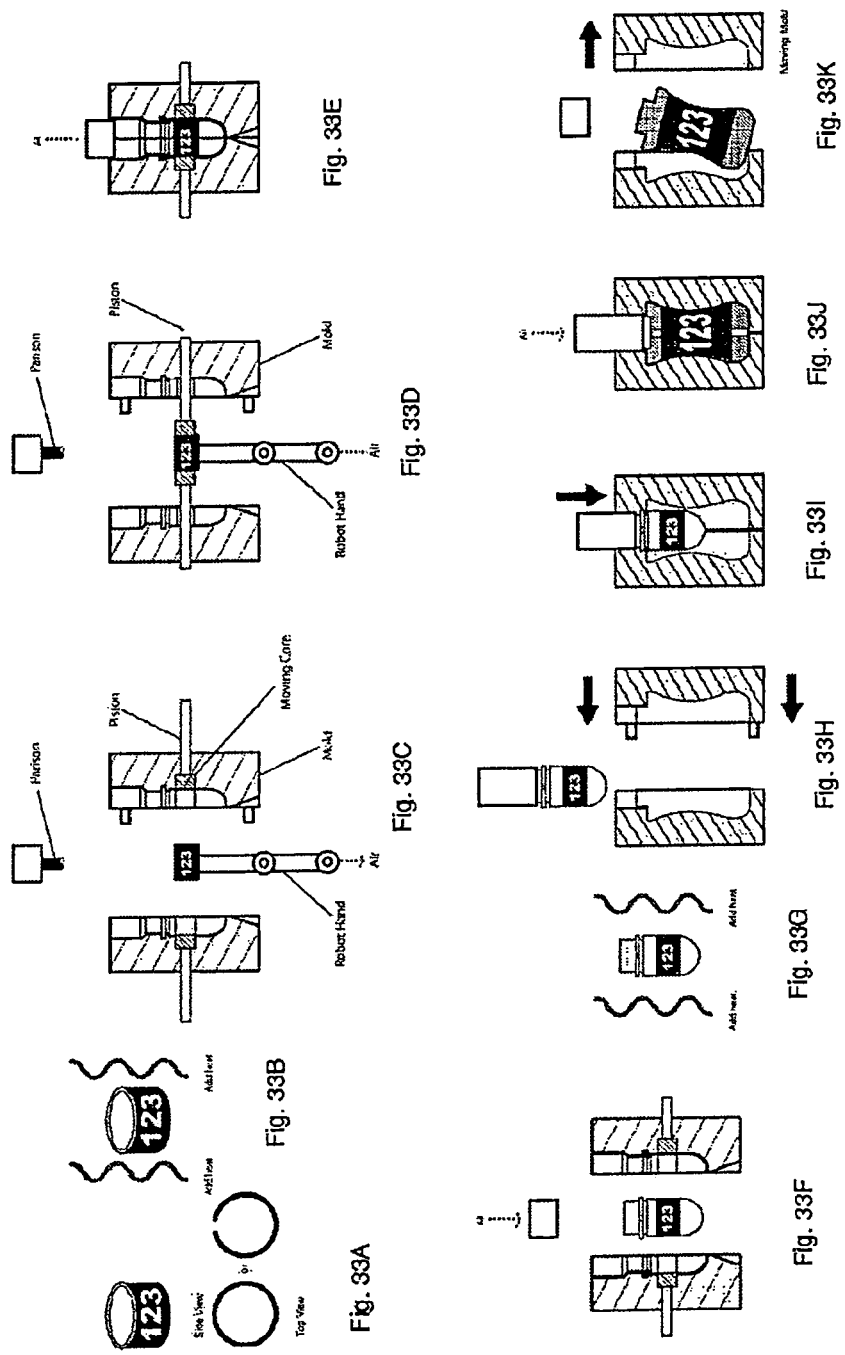

METHOD OF FORMING THERMOPLASTIC ARTICLE

TECHNICAL FIELD

The present invention relates to methods for forming a thermoplastic article, and more particularly to methods for forming a thermoplastic article of various colors, patterns, materials and/or components.

BACKGROUND OF THE INVENTION

There are various methods of forming articles, such as a bottle made of plastic materials, in particular thermoplastic materials. However, it is very difficult to form such articles with different components mounted firmly thereon, for enhancing the function and/or the outlook of the articles. It is also difficult to form such articles of various colors, patterns, materials as desired.

SUMMARY OF THE INVENTION

It is thus an object of the present invention to provide a method for forming a thermoplastic article in which more varied colors, patterns, and/or components may be formed, thus enhancing the function and/or aesthetic appeal of the article, or at least to provide a useful alternative to the public and trade.

According to one aspect of the present invention, the technical solution of the present invention provided for the above object being a method for forming a thermoplastic article, comprising steps of:

positioning at least one preheated first component being hollow and having at least one open end in two co-operating first mould halves;

extruding a blow-mouldable thermoplastic material into the first component and closing the mould halves; and blowing the blow-mouldable thermoplastic material inside the mould halves to form an article on which the first component is fixedly engaged.

According to another aspect of the present invention, a method for forming a thermoplastic article is provided, which comprises steps of:

plastic moulding a first component being hollow and having at least one open end and heating the first component at a required temperature;

positioning the first component in two co-operating first mould halves;

positioning a blow head with a heated pre-blow plastic part in the first component inside the two co-operating first mould halves and closing them, and then making a stretch rod to contact inner mould bottom; and blowing the first component and pre-blow plastic part in the mould halves through the blow head to form an article on which the first component is fixedly engaged.

According to embodiments of the present invention, the first component might be positioned by placing it onto one of the two co-operating first mould halves. Alternatively, the first component might be positioned by placing it between the two cooperating first mould halves and fixing it with a separated movable inner core.

According to a further aspect of the present invention, a method for forming a thermoplastic article is provided, which comprises steps of:

plastic moulding a first component being hollow and having at least one open end into which a moulded pre-blow plastic part is inserted;

heating the first component and the pre-blow plastic part at a required temperature and mounting them on a blow head;

positioning the blow head with the first component and pre-blow plastic part in two co-operating first mould halves and closing them, and then making a stretch rod to contact inner mould bottom; and blowing the first component and pre-blow plastic part in the mould halves through the blow head to form an article on which the first component is fixedly engaged.

According to embodiments of the present invention, the first component might be formed by roto-moulding, and at least one end of which is cut away before being positioning in the first mould halves.

According to an embodiment of the present invention, it further comprises a step of positioning at least one second component in the two co-operating first mould halves before closing the mould halves. Preferably, the first component might further engage with at least one second component by affixing, jointing, inter-locking, screwing or welding.

According to another embodiment of the present invention, it further comprises steps of: placing preheated article into a second mould; inserting at least one third component into the second mould; and blowing the preheated article in the second mould to form a new article on which the third component is fixedly engaged. Alternatively, it might further comprise steps of: placing the article into an injection mould; and injecting liquefied plastic into the injection mould to form different components on the article. Preferably, it further comprises a step of blowing hot air into the article before and/or during step of injecting liquefied plastic.

According to embodiments of the present invention, the first component might be of a generally circular transverse cross-section. Alternatively, the first component might be of a generally C-shaped transverse cross-section.

According to embodiments of the present invention, the blow-mouldable thermoplastic material or the material of the heated pre-blow plastic part might be selected from the group consisting of polypropylene (PP), acrylonitrile butadiene styrene (ABS), high-impact polystyrene (HIPS), polyvinyl chloride (PVC), polycarbonate (PC), hermoplastic elastomer (TPE), ethylene vinyl acetate (EVA), eastman tritan copolyester, polyethersulfone (PES) or nylon.

According to yet still another embodiment of the present invention, it further comprises a step of heating the article to at least the forming temperature of the blow-mouldable thermoplastic material.

According to again another embodiment of the present invention, it further comprises a step of positioning a third component into the second mould before blow-moulding the article in the second mould, such that the article is fixedly engaged with the third component after the step of blow-moulding the article in the second mould.

According to the present invention, the first component might be made of a plastic material and formed by insert-moulding, injection-moulding, over-moulding, blow moulding, roto-moulding, compression moulding or liquid injection moulding.

According to embodiments of the present invention, the second component and the third component might respectively be a thermometer, a handle, a clock, a timer, a compass, an electronic module, a decorative item, or a closed container with a liquid or solid content movable within said container.

According to the present invention, a thermoplastic article having varied colors, patterns, and/or functional components of various materials formed on its outer surface could be realized via a single blow moulding or double blow moulding process as stated hereinbefore, wherein the forming method of the present invention is simple in implementation, low in cost and easy in modification for forming a versatile thermoplastic article as requested.

BRIEF DESCRIPTION OF THE DRAWINGS

The further objects, features, characteristics and effects of the present invention will be illustrated in more details by way of example with reference to the accompany drawings, wherein:

FIG. 1A is a front view of a first component adapted for used in a forming method according to the present invention;

FIG. 1B is a top view of the first component of FIG. 1A;

FIG. 1C is a top view of an alternative first component according to the present invention;

FIGS. 2-7 illustrate steps of forming an article with the forming method according to the present invention;

FIGS. 13A-18A illustrate respectively a front view of an alternative finished article according to the present invention;

FIGS. 13B-18B illustrate respectively a partial sectional view of the finished article in FIGS. 13A-18A;

FIG. 19 shows a front view of another finished article according to the present invention;

FIGS. 20A-22A illustrate respectively a front view of an alternative finished article according to the present invention;

FIGS. 20B-22B illustrate respectively a partial sectional view of the finished article in FIGS. 20A-22A;

FIGS. 23A-23H illustrate one embodiment of the present invention;

FIGS. 24A-24H illustrate another embodiment of the present invention;

FIGS. 25A-25J illustrate a further embodiment of the present invention;

FIGS. 26A-26H illustrate another embodiment of the present invention;

FIGS. 27A-27K illustrate a further embodiment of the present invention;

FIGS. 28A-28J illustrate still another embodiment of the present invention;

FIGS. 29A-29I illustrate yet still another embodiment of the present invention;

FIGS. 30A-30H illustrate a further embodiment of the present invention;

FIGS. 31A-31H illustrate another embodiment of the present invention;

FIGS. 33A-33K illustrate another embodiment of the present invention.

DETAILED DESCRIPTION OF THE PREFERRED EMBODIMENTS

Figure 8:
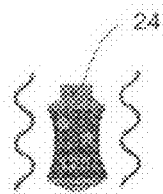
FIGS. 8-11 illustrate steps of integrating one or more additional components with the article.

A front view of a first component 10 which may be used in a method according to the present invention is shown in FIG. 1A. The first component 10 could be a sleeve type component, for example, it may have an endless wall 12 (as shown in the corresponding top view FIG. 1B) with two wider open longitudinal ends and a narrower intermediate portion. Such a first component 10 thus has a circular transverse cross-section. Alternatively, the first component 10 may have a generally C-shaped cross-section (as shown in FIG. 1C). Further, the first component 10 could be a hollow component having an arbitrary cross-section and at least one longitudinal open end while the intermediate portion might be wider or the same as the end portion thereof. At a lower end of the first component 10 a pin 14 might be arranged and the function of which will be described below.

The first component 10 might be made of a plastic material, such as acrylonitrile butadiene styrene (ABS), polypropylene (PP), polyvinyl chloride (PVC), high-impact polystyrene (HIPS), ethylene vinyl acetate (EVA), general purpose polystyrene (GP), polycarbonate (PC), eastman tri-tan copolyester, or thermoplastic elastomer (TPE); and it may be formed by blow moulding, roto-moulding, compression moulding, liquid injection moulding, insert-moulding, over-moulding or injection-moulding (including double-injection moulding or multi-color injection moulding); such that the first component 10 may be formed of different plastic materials, with different colors and transparencies, and fixedly engaged with other components of the same or different materials, e.g. a handle, or a thermometer.

As shown in FIG. 2, a pair of mould halves 16a, 16b is provided, and the first component 10 could be preheated and positioned onto the mould half 16a by inserting the pin 14 into a recess in the mould half 16a. Alternatively, the first component 10 may be positioned onto the mould half 16a by applying a suction force on the first component 10.

A strip of blow-mouldable thermoplastic material/parison 18 (such as polyester eastman, nylon, polypropylene (PP), acrylonitrile butadiene styrene (ABS), high-impact polystyrene (HIPS), polyvinyl chloride (PVC), polycarbonate (PC), thermoplastic elastomer (TPE), eastman tritan copolyester, polyethersulfone (PES), or ethylene vinyl acetate (EVA)) is extruded from a blow-moulding machine 20 into a space within the first component 10 and between the mould halves 16a, 16b, during which time the mould halves 16a, 16b might close by having the mould half 16b move towards the mould half 16a (see FIG. 3), for example.

During or before such mould-closing movement, at least one second component may be positioned onto the mould half 16a and/or 16b. The second component may be a thermometer, a handle, a clock, a timer, a compass, an electronic module, a decorative item or a closed container with a liquid, wherein the second component could be mounted at the first component by affixing, jointing, screwing or welding, etc.

Once the mould halves 16a, 16b are closed to form a cavity enclosing the first component 10 and the extruded blow-mouldable thermoplastic material 18, as shown in FIG. 4, extrusion of the blow-mouldable thermoplastic material 18 is stopped.

The blow-moulding machine 20 then blows air into the cavity between the mould halves 16a, 16b (see FIG. 5) to enlarge the blow-mouldable thermoplastic material 18 in the mould halves 16a, 16b to a first shape and a first configuration conforming to the inner surface of the mould halves 16a, 16b. After separation of the mould halves 16a, 16b, a workpiece 22 formed by this blow-moulding process is detached from the mould halves 16a, 16b. It can be seen in FIG. 6 that the first component 10 is fixedly engaged with the outer surface of the workpiece 22. If a second component is inserted (as discussed above) into the mould halves 16a, 16b, the component will be also fixedly engaged with the workpiece 22. After cutting out unwanted parts (e.g. the pin 14) of the workpiece 22, an article 24 is formed, as shown in FIG. 7.

The article 24 (which could be a bottle as shown in the figure) may itself be a finished article. Alternatively, it may be used as a semi-finished article to be subjected to additional steps of treatment.

Figure 9:
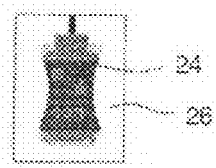

While being used as a semi-finished article as shown in FIG. 8, the article 24 may be subsequently heated to above the forming temperature of the blow-mouldable thermoplastic material. The so-heated article 24 is then placed in a second mould 26, as shown in FIG. 9. At least one third component may be inserted in the second mould 26. The third component may be a thermometer, a handle, a clock, a timer, a compass, an electronic module, a decorative item, or a closed container with a liquid.

Figure 10:
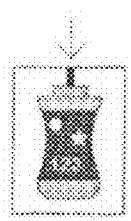
Figure 11:
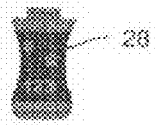

As shown in FIG. 10, air could be blown into the article 24 in the second mould 26 to blow-mould the article 24 a second time, so as to stretch the article 24 to a second shape and a second configuration conforming to the inner surface of the second mould 26, wherein the second shape and configuration might differ from the first shape and configuration of the once blow-moulded article 24 as shown in FIG. 7. If a third component is inserted in the second mould 26, as discussed above, the third component will be fixedly engaged with the outer surface of the twice blow-moulded article 24. A finished article 28 is thus formed, and detachable from the second mould 26, as shown in FIG. 11.

An advantage of the above double-blow-moulding process is that the finished article 28 is more transparent and thinner in thickness than the article 24 which has only undergone blow-moulding once in the foregoing single-blow-moulding process. In addition, as an article 24 or 28 formed by the present method may be fixedly engaged with one or more components by either single-blow-moulding or double-blow-moulding process, the aesthetic appeal and functionality of the article 24 or 28 are varied and enhanced.

Figure 12:
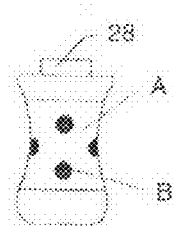
FIG. 12 shows a front view of a finished article according to the present invention.
Figures 13A, 13B:
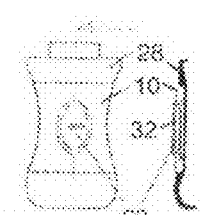

As shown in FIG. 12, a finished article 28 formed according to present invention may be of two or more colors A, B, while the first component 10 itself may be of two or more colors. As shown in FIGS. 13A and 13B, the first component 10 fixedly engaged with the article 28 might be fixedly engaged with a foregoing second component and/or a third component, and according to the present embodiment, the third component might be a thermometer 30 encased within a transparent waterproof casing 32 for measuring the temperature of the content in the article 28. As the casing 32 is transparent, a user is allowed to read the temperature reading of the thermometer 30.

As shown in FIGS. 14A and 14B, the first component 10 might be fixedly engaged with a second and/or a third component, namely a layer 34 with a three-dimensional pattern or character acting as a decorative item, which may be formed by blow-moulding and mounted thereinto via a single or double blow moulding process of the present invention. The three-dimensional pattern or character may be made of a transparent material and colors might be painted on the back of the three-dimensional pattern, wherein the colors on the three-dimensional pattern or character will not be easily scratched and peeled off.

As further shown in FIGS. 15A and 15B, the second or third component fixedly engaged with the first component 10 might be a transparent or translucent soft waterproof plastic cover 36 printed with a scrape-proof pattern 38. It should of course be understood that the cover 36 may be printed with a marking, letter(s), logo(s), word(s), or the like. Similarly, the cover 36 might be mounted thereinto via a single or double blow moulding process of the present invention.

In another embodiment of the present invention as shown in FIGS. 16A and 16B, the second or third component fixedly engaged with the first component 10 of the article 28 might be a closed container 40 with a transparent or translucent front plate containing a number of solid plastic beads 42 which are movable within the container 40. This would enhance the fun of using the article 28, especially in cases where the article 28 is a feeding bottle for toddlers. Similarly, the closed container 40 might be mounted thereinto via a single or double blow moulding process of the present invention.

In a further embodiment of the present invention as shown in FIGS. 17A and 17B, the second or third component fixedly engaged with the first component 10 of the article 28 might be a label 44 within a casing 46. The casing 46 is waterproof, and does not allow the label 44 within to come out. Similarly, the casing 46 might be mounted thereinto via a single or double blow moulding process of the present invention.

As shown in FIGS. 18A and 18B, the second or third component fixedly engaged with the first component 10 of the article 28 might be a transparent or translucent closed plastic box or pouch 48 containing a transparent, translucent or colored liquid 50 which is movable within the cavity of the box 48. Similarly, the box or pouch 48 might be mounted thereinto via a single or double blow moulding process of the present invention.

In another embodiment of the present invention as shown in FIG. 19, the second or third component fixedly engaged with the article 28 might be a pair of handles 52 allowing for easy gripping by a user's hand.

In still another embodiment of the present invention as shown in FIGS. 20A and 20B, the first component 10 of the article 28 might be fixedly engaged, by way of a single or double blow moulding method according to the present invention and discussed above, with a clock or timer 54 with a clear soft plastic cover 56.

In yet still another embodiment of the present invention as shown in FIGS. 21A and 21B, the first component 10 of the article 28 might be fixedly engaged, by way of a single or double blow moulding method according to the present invention, with a compass 58 within a clear plasticbox 60.

In yet still a further embodiment of the present invention as shown in FIGS. 22A and 22B, the article 28 might be fixedly engaged, by way of a single or double blow moulding method according to the present invention, with an electronic module 62 within a soft plastic cover 64. In particular, the electronic module 62 is provided with a press button 66 which may be operated to activate the function of the module 62, e.g. emitting sound/music, turning on or blinking a light-emitting-diode (LED), and the like.

Although in the embodiments shown in FIGS. 12 to 22B, the second or third components are described as being fixedly engaged with the first component 10 of the twice blow-moulded finished article 28 by means of the double blow moulding process of the present invention, it should be understood that such components may be fixedly engaged with the first component 10 of the once blow-moulded article 24 by means of the single blow moulding process of the present invention. Further, multiple second components could be mounted in combination with multiple third components at the first component as requested. In addition, although the invention has so far been described in the context of a method of forming a bottle, the article 24 or 28 may instead be a cup, a bowl, a lampshade, or the like.

Referring to FIGS. 23A-23H, which illustrate another embodiment of the present invention. Firstly, a first component is plastic moulded, which might have a circular transverse cross-section and generally C-shaped cross-section, for example. The first component might be preheated under a required temperature, such that the inner wall of which will solder or stick to the outer surface of a blow moulded article during a blow moulding process, which will be described in more details as below. The heated first component is positioned onto one of the mould halves. Preferably, it could be place accurately on position by a robot hand. According to the embodiment, the first component is placed fixedly on the mould half with the suction generated by a vacuum air pump. Thereafter, the parison is passed into the first component and the mould is closed, wherein the parison might be cut, preferably by parison pinch seal knife or hot cut. The parison is blown outward to take shape of the mould cavity, and then, the mould halves could be opened and the semi-product is ejected therefrom. After cutting out unwanted parts, a finished article is completed.

According to present invention, one or more second components may be positioned onto the first component. The second component may be a thermometer, a handle, a clock, a timer, a compass, an electronic module, or the like.

Referring to FIGS. 24A-24H, which illustrate another embodiment of the present invention. The first component could be moulded or installed a pair of handles. The heated first component is positioned onto the mould half. A robot hand could be used to place the first component on position accurately, wherein the first component is placed fixedly on the mould half with the suction of vacuum air. As can be seen, there exists a recess on the mould, which conforms to the shape of a desired handle or umbo. Parison is then passed thought the first component and the blow moulding is processed. After the process of blowing, cooling and working process as described above, an article with a handle is finished as shown in FIG. 24C.

According to the embodiment one or more additional/second components may be positioned onto the first component, such as a thermometer, a handle, a clock, a timer, a compass, an electronic module, or the like. The heated first component could be positioned onto the mould half, as shown in FIG. 24d. The use of a robot hand is a best way to place the first component on position accurately. The first component is placed fixedly on the mould half with the suction of vacuum air. As can be seen, there is a recess on the mould, which conforms to the shape of the additional components. As can be seen in FIGS. 24E-24F, Parison is passed thought the first component for the process of blow moulding. After the process of blowing, cooling and working process, an article with first component and second component is finished. A section view of the first component is shown in 24G, while a section view of the first component after blowing process is shown in 24H. According to the embodiment, the second component might be installed on the first component by affixing, jointing, inter-locking, screwing, welding, or the like.

Referring to FIGS. 25A-25J, which illustrate another embodiment of the present invention. Similarly, a first component is plastic moulded, which might have a circular transverse cross-section and generally C-shaped cross-section, for example. The first component might be preheated under a required temperature, such that the inner wall of which will solder or stick to the outer surface of a blow moulded article during a blow moulding process, which will be described in more details as below. The blow mould halves are opened and the heated first component is placed between the mould halves, preferably by a robot arm. According to the embodiment, a special mould construction is provided, which allows a part of inner core to be separated and movable therein. The shape of the movable inner core is fitted to the outer shape of the first component. This inner core might be respectively connected to piston which is controlled by a programmable pneumatic cylinder or an electronic motor and a gear box. After removing the robot arm, the first component is still kept in position as being fixed by the inner core. After closing the blow mould halves, the piston is moving and the inner core goes back to its original position. The shape of the mould cavity will defined the shape of the article. Thereafter, the hot parison is extruded from a blowing machine and passed though the first component. Once the mould is closed, parison might be cut by parison pinch seal knife or hot cut. The parison is then blown outward to take shape of the mould cavity. The blow mould halves will then be opened, and the semi-product is ejected from the blow mould machine for cooling. After cutting out the unwanted parts, a finished article is completed as shown in FIG. 25J.

Referring to FIGS. 26A-26H, which illustrate another embodiment of the present invention. Similarly, one or more additional components, such as a thermometer, a handle, a clock, a timer, a compass, an electronic module, or the like, may be positioned onto the first component before fixing it with a movable inner core. According to the embodiment, the first component is moulded or installed a pair of handles. The blow mould halves are opened and first component is placed thereinbetween. There exists a recess on the movable inner core, which is fitted to the shape of the handle or umbo of the first component. After removing the robot arm, the first component is kept in position by the inner core, wherein the handles or umbo are fit completely into the recess. After carrying out the process of blowing, cooling and working process as described above, an article with first component and handle is finished as shown in FIG. 26C. Alternatively, the first component may engage with another additional component, such as a thermometer, a clock, a timer, a compass, or an electronic module, before being placed between the mould halves. Correspondingly, there is a recess on the movable inner core, which matches the shape of such additional component. The sectional view of the first component is shown in FIG. 26G, wherein the additional/second component might be mounted on first component by affixing, jointing, inter-locking, screwing, welding, etc. The sectional view of the article engaged with the first component and the second component is shown in FIG. 26H.

Referring now to FIGS. 27A-27K, which illustrate a further embodiment of the present invention, wherein a stretch blow mould process is used for forming a thermoplastic article of various, patterns, materials, and/or components. The first component might be formed by roto moulding and being made of a plastic material, such as Polypropylene, Polyvinyl chloride, or the like. Roto moulding is also known as rotational casting by which a hollow and virtually seamless part could be produced, wherein plastic could be poured into a mould and turned in opposing direction for smooth distribution on the casting medium. Such process can reduce finishing costs and easy to make a part in varied shape. According to the embodiment, the first component is firstly made into a hollow and closed shape. Afterwards, two ends of the first component are cut away to form two open ends and a generally circular transverse cross-section. Preferably, the first component is preheated at required temperature before being positioned in the mould halves. A pre-blow plastic part might be also heated at required temperature and then engaged with a blow head. After the main mould halves are closed, a special mould construction of the present invention allows a part of the mould to be separated from the closed main mould. The first component is placed fixedly on the separated mould part with the suction of vacuum air. Preferably, a robot arm is used to place the first component on position accurately. The separated mould part and the first component could be inserted back into the closed main mould. The blow head and the heated pre-blow plastic part are then positioned between blow mould halves. Once the blow head has been seated, a stretch rod is lowered until it contacts the inner bottom of the heated pre-blow plastic parts, thereafter, air is introduced though the blow head to inflate the pre-blow plastic parts. The blow-mouldable thermoplastic material of the pre-blow plastic part is enlarged and passed though the first component to a shape and configuration conforming to the inner shape of the mould cavity. The heated blow-mouldable thermoplastic material will contact and solder the inner wall of heated first component. As can be seen in FIG. 27H, the blow mould halves are opened and a semi-product is ejected from the blow mould machine. After cutting out unwanted parts, a finished article is completed. According to the embodiment, more colors and components can be added on such a finished article. The article could be put inside the mould of injection mould machine. Plastic pellets could be loaded into a hopper at the top of an injection unit (not shown). The pellets are fed into a main cylinder in which they are heated and liquefied. Inside the injection unit there is a screw for turning and mixing the plastic, and once the liquid plastic has reached an optimum state, the injection process could be started. Preferably, hot air could be blown into the article to reinforce the shape, and then two mould halves will be closed. The liquefied plastic will be forced through a sprue and flow into the mould to form different colors, components and material on the first component or the finished article. After the cooling process, a clamp unit thereof could be opened and the mould will be separated, such that a new semi-product will be ejected from the injection mould machine. After cutting out unwanted parts therefrom, a new finished article undergone double moulding process is completed as shown in FIG. 27K.

Figure 28A:
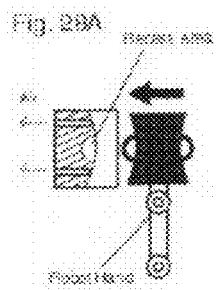
Figure 28E:
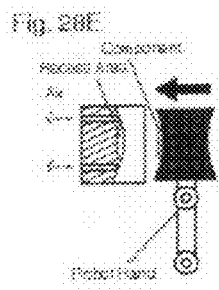
Figure 28J:
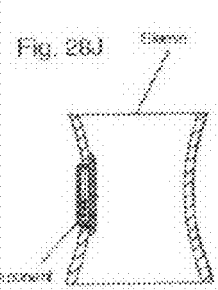
Figure 28B:
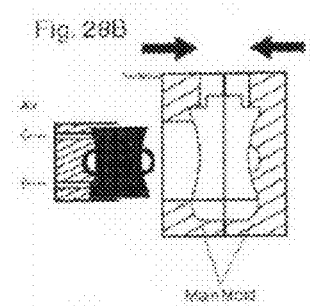
Figure 28F:
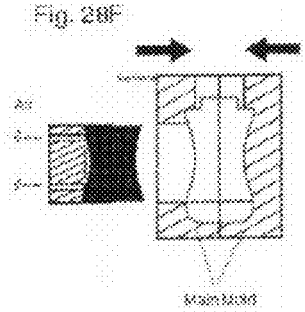
Figure 28C:
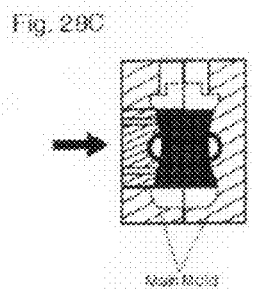
Figure 28G:
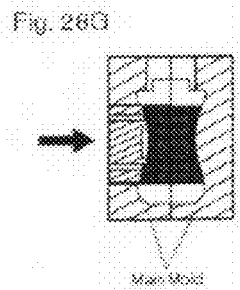
Figure 28D:
Figure 28I:
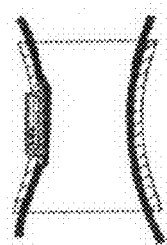

Referring to FIGS. 28A-28J, which illustrate another embodiment of the present invention. Similarly, one or more additional components, such as a thermometer, a handle, a clock, a timer, a compass, an electronic module, or the like, may be positioned onto the first component. According to the embodiment, the first component could be moulded or installed a pair of handles. The first component could be placed fixedly on the separated mould part with the suction of vacuum air, wherein the handle is engaged with a recess on the separated mould part. Once the main mould halves are closed, the separated mould part and the first component are inserted back into the closed main mould for further processing. After the process of blowing, cooling and working process as described above, an article having a pair of handles is finished as shown in FIG. 28D. Alternatively, the first component may engage with another additional component, such as a thermometer, a clock, a timer, a compass, an electronic module, or the like, before being inserted into the mould halves. Correspondingly, the shape of the recess on the movable mould part matches the shape of the additional component. The sectional view of the first component is shown in FIG. 28I, wherein the additional/second component might be mounted on first component by affixing, jointing, inter-locking, screwing, welding, etc. The sectional view of the article engaged with the first component and the second component is shown in FIG. 28J.

Referring to FIGS. 29A-29I, which illustrate another embodiment of the present invention. Similarly, a first component is plastic moulded, which might have a circular transverse cross-section and generally C-shaped cross-section, for example. The first component and a pre-blow plastic part might be respectively preheated under a required temperature, such that the inner wall of which will solder or stick to the outer surface of a blow moulded article during a blow moulding process, which will be described in more details as below. The blow mould halves are opened and the heated first component is placed onto the mould halves, preferably by a robot arm, and fixed thereon with the suction of vacuum air. After removing the robot arm and closing the mould halves, a blow head and the heated pre-blow plastic part could be positioned between mould halves and pass on to the first component. Once the blow head has been seated, a stretch rod is lowered until it contacts the inner bottom of the pre-blow plastic part. When the stretch rod contacted the inner bottom, air is introduced though the blow head to inflate the pre-blow plastic part. The pre-blow plastic part made of a blow-mouldable thermoplastic material is enlarged and passed though the first component to the shape and configuration conforming to the inner shape of the mould cavity. The heated blow-mouldable thermoplastic material will contact and solder the inner wall of heated first component. After cooling, the mould halves will be opened, and a semi-product will be ejected from the blow mould machine by reversing the flow direction of vacuum air. After cutting out unwanted parts therefrom, a finished article is completed.

Referring to FIGS. 30A-30H, which illustrate another embodiment of the present invention. According to the embodiment, one or more additional components, such as a thermometer, a handle, a clock, a timer, a compass, an electronic module, or the like, may be positioned onto the first component in a similar manner set forth hereinbefore. As can be seen, the first component could be moulded or installed a pair of handles. The first component could be placed fixedly on one of the mould halves with the suction of vacuum air, wherein the handle is engaged with a recess on the mould half. After closing the mould halves, the first component and the handles will be subjected to the blowing, cooling and working process as described above, and an article having a pair of handles is finished as shown in FIG. 30C. Alternatively, the first component may engage with another additional component, such as a thermometer, a clock, a timer, a compass, an electronic module, or the like, before being placed into the mould halves. Correspondingly, the shape of the recess on the mould half matches the shape of the additional component. The sectional view of the first component is shown in FIG. 30F, wherein the additional/second component might be mounted on first component by affixing, jointing, inter-locking, screwing, welding, etc. The sectional view of the article engaged with the first component and the second component is shown in FIG. 30G.

Referring now to FIGS. 31A-31H, which illustrate another embodiment of the present invention. As can be seen, a first component could be plastic moulded. such that it might have a circular transverse cross-section and generally C-shaped cross-section, for example. The first component might be preheated under a required temperature, such that the inner wall of which will solder or stick to the outer surface of a pre-blow plastic part inserted thereinto. The first component and the pre-blow plastic part might be heated altogether at a required temperature, and then mounted on a blow head of a blow machine, while the mould halves could be closed. After the blow head engaged with the heated pre-blow plastic part and the first component are positioned properly, a stretch rod is lowered until it contacts the inner bottom of the pre-blow plastic part. When the stretch rod contacted the inner bottom, air is introduced though the blow head to inflate the pre-blow plastic part and the first component. The blow-mouldable thermoplastic material of the pre-blow plastic part and the first component are enlarged to a configuration conforming to the inner shape of the mould cavity. After cooling, the blow mould is opened and a semi-product is ejected from the blow mould machine by reversing the flow direction of vacuum air. A finished article is produced after cutting out the unwanted parts thereof.

Figure 32A:
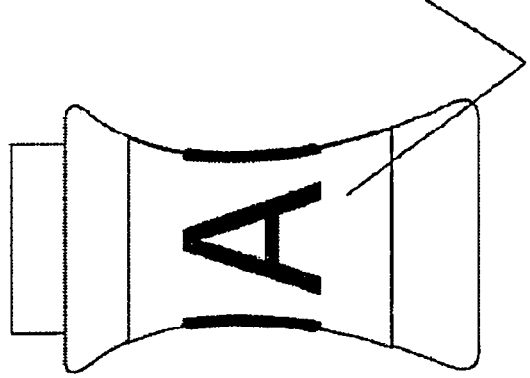
FIGS. 32A-32C illustrate a further embodiment of the present invention.
Figure 32B:
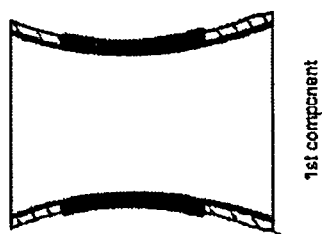
Figure 32C:
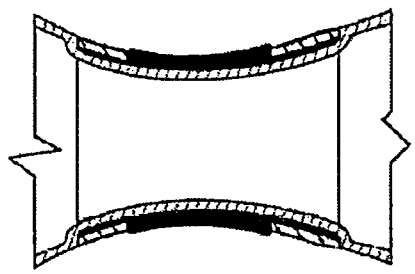

Referring now to FIGS. 32A-32C, which illustrate another embodiment of the present invention. FIG. 32A is a front view of a thermoplastic article with the first component, which is moulded with different colors and/or patterns, such as alphanumeric characters. FIG. 32B is a sectional view of the first component, wherein the alphanumeric characters and the inner part are made of Fastman tri-tan copolyester, on which a layer of another material, for example, TPE could be over-moulded. The different materials might form different colors, and provide hard and soft feeling to the users. FIG. 32C is a sectional view of the thermoplastic article on which the first component is fixed. After the moulding process, the first component is fixed on the thermoplastic article made of Eastman tri-tan copolyester by the good bonding therebetween. According to the present invention, a preferred bonding between the first component and the thermoplastic article will be achieved when the contacting surfaces of them are of same material, such as the Eastman tri-tan copolyester.

Referring now to FIGS. 33A-33K, which illustrate a further embodiment of the present invention. As can be seen, a plastic moulded first component has a circular transverse cross-section and a generally C-shaped cross-section. It would be moulded to be of different colors and materials, or it could be translucent. The first component might be pre-heated at a required temperature. As a result of this, the inner wall of the first component will solder or stick to the outer surface of the blow moulded article during a blow molding process, which will be described below in further details. The heated first component is then placed between two blow mold halves, preferably by a robot arm. A hot parison is extruded from the blowing Machine. As can be seen, a special mould construction of the present invention allows a part of inner core to be separated from the mould halves for holding the first component is position. The shape of the movable inner core is fitted to the outer shape of the first component, and the inner core might be connected to a piston being controlled by a programmable pneumatic cylinder or an electronic motor and a gear box. After the removal of the robot arm, the first component is fixed by the inner core, and then the blow mould halves will be closed. The piston is driven and the inner core returns to its original position. The hot parison will pass though the first component and will be cut by means of a parison pinch seal knife or hot cut once the mould halves are closed. The parison is blown outward to take shape of the mold cavity. The Blow mold halves will be then opened. A semi-product is ejected from the blow mold machine as shown in FIG. 33F. After cutting out unwanted parts, a finished pre-blow plastic part with the first component is completed. According to the embodiment, the finished pre-blow plastic part with the first component might be further subjected to a blow and stretch molding. The pre-blow plastic parts could be heated at a required temperature. The Heated pre-blow plastic part with the first component might be positioned onto a blow and stretch mould. Once the blow head has been seated, a stretch rod is lowered until it contacts the inner bottom of the heated pre-blow plastic part. When the stretch rod contacts the inner bottom, air might be introduced though the blow head to inflate the pre-blow plastic part, which is enlarged to a shape and configuration conforming to the inner shape of the cavity of the blow and stretch mould. After cooling, the mould halves will be opened, and a semi-product is ejected from the mould as shown in FIG. 33K. After cutting out unwanted parts therefrom, a finished article with the first component is produced.

It should be understood that the above are merely several illustrative embodiments of the present invention, wherein various modifications and/or alterations may be made thereto without departing from the spirit and scope of the invention and its claims.

The invention claimed is:

1. A method for forming a thermoplastic article of various colors, patterns, materials and/or components, comprising steps of:
  a) separately plastic-moulding a first component in a solid state which is perforated or formed with desired colors, patterns, and/or materials, said first component being hollow and having at least one open end and configured to conform in shape to at least a part of a body of the article to be moulded, and heating the solid first component at a required temperature;
  b) providing two co-operating first mould halves and positioning fixedly the heated first component in one of the two first mould halves or centrally between the two first mould halves;
  c) heating a moulded pre-blow plastic part having a desired shape and having a wall of a desired thickness and positioning a blow head with the heated moulded pre-blow plastic part, wherein the heated moulded pre-blow plastic part passes through the hollow first component, and closing the first mould halves with the first component being fitted snugly over an inner shape of the two cooperating first mould halves, and then making a stretch rod contact an inner bottom of the pre-blow plastic part; and
  d) blowing air through the blow head into the pre-blow plastic part to inflate the pre-blow plastic part to fit over an inner surface of the first component so as to form the article in the same first mould halves, wherein the first component is overmoulded onto an outer surface of the body of the article,
  wherein the solid first component is heated in step a) such that only the inner surface of the first component becomes soft to solder or stick to the outer surface of the body of the article to form the overmoulding therebetween, and
  wherein the inner surface of the first component is heated at the required temperature adjustable for adaption of the pre-blow plastic part to permit the soldering or stickiness of the inner surface of the first component onto the outer surface of the body of the article.

2. A method according to claim 1, further comprising steps of:
  e) preheating the article and then placing the preheated article into a second mould;
  f) inserting at least one second component into the second mould; and g) blowing air into the preheated article in the second mould to form a new article on which the second component is fixedly engaged.

3. A method according to claim 1, further comprising steps of:
h) placing the article into an injection mould; and
i) injecting liquefied plastic into the injection mould to form different components on the first component or on the article.

4. A method for foil ling a thermoplastic article of various colors, patterns, materials, and/or components, comprising steps of:
a) separately plastic-moulding a first component in a solid state which is perforated or formed with desired colors, patterns, and/or materials, said first component being hollow and having at least one open end;
b) passing a moulded pre-blow plastic part through the hollow first component, the moulded pre-blow plastic part being provided to have a desired shape and have a wall of a desired thickness;
c) heating the solid first component with the moulded pre-blow plastic part at a required temperature and mounting them on a blow head;
d) providing two co-operating first mould halves and fixedly positioning the blow head with the first component and the pre-blow plastic part in one of the two first mould halves or centrally between the two first mould halves, and closing the first mould halves, and then making a stretch rod contact an inner bottom of the pre-blow plastic part; and
e) blowing air through the blow head into the pre-blow plastic part to inflate the pre-blow plastic part and the first component so as to form the article in the same first mould halves, wherein the first component is over-moulded onto an outer surface of the body of the article,
wherein the solid first component is heated in step a) such that only the inner surface of the first component becomes soft to solder or stick to the outer surface of the body of the article to form the overmoulding therebetween, and
wherein the inner surface of the first component is heated at the required temperature adjustable for adaption of the pre-blow plastic part to permit the soldering or stickiness of the inner surface of the first component onto the outer surface of the body of the article.

5. A method according to claim 4, further comprising steps of:
f) preheating the article and then placing the preheated article into a second mould;
g) inserting at least one second component into the second mould; and
h) blowing air into the preheated article in the second mould to form a new article on which the second component is fixedly engaged.

6. A method according to claim 4, further comprising steps of:
i) placing the article into an injection mould; and
j) injecting liquefied plastic into the injection mould to form different components on the first component or on the article.

7. A method according to claim 1, wherein the first component has a pin arranged at a lower end thereof and is positioned onto the one of the two first mould halves by inserting the pin into a recess formed in the first mould half.

8. A method according to claim 1, wherein the first component is positioned onto the one of the two first mould halves by applying a suction force on the first component.

* * * * *